DIALING APPARATUS FOR TELEPHONE APPARATUS

Filed Dec. 26, 1961

Inventor:
Hermann Ries
By: Michael S. Striker
Attorney

Aug. 31, 1965

H. RIES 3,204,046

DIALING APPARATUS FOR TELEPHONE APPARATUS

Filed Dec. 26, 1961

2 Sheets-Sheet 2

Inventor:
Hermann Ries
by Michael S. Striker
his attorney

United States Patent Office 3,204,046
Patented Aug. 31, 1965

3,204,046
DIALING APPARATUS FOR TELEPHONE APPARATUS

Hermann Ries, 15 Brahmstrasse, Bremen, Germany

Filed Dec. 26, 1961, Ser. No. 162,175
Claims priority, application Germany, Dec. 27, 1960, R 29,353
5 Claims. (Cl. 179—90)

The present invention relates to a dialing apparatus for impulse controlled telephone apparatus, and more particularly to a device in which a desired telephone number is first selected, whereupon the device is actuated to automatically produce all impulses required for obtaining the desired telephone connection.

The present application is a continuation-in-part application of my co-pending application for a dialing arrangement for a telephone apparatus, Serial No. 741,184, and filed June 10, 1958, now Patent 3,095,481.

Semi-automatic dialing devices are known in which a desired telephone number is selected by individually selecting each digit, whereupon the pulses for obtaining the desired telephone connection are produced by a manual operation.

It is one object of the present invention to improve the semi-automatic dialing devices according to the prior art, and to provide a dialing apparatus of simple construction which can be easily set to a desired telephone number, and can be operated without any difficulty.

Another object of the present invention is to provide a dialing apparatus including a band on which a plurality of desired telephone numbers is represented by elements capable of producing impulses, so that the necessary impulses are transmitted to a telephone apparatus when these elements are sensed by suitable electrical means.

Another object of the present invention is to provide magnetic actuating elements representing the digits of telephone numbers on the band, and to sense the magnetic elements by a pick-up head moved across the band.

With these objects in view, one embodiment of the invention comprises a band having a plurality of transverse rows of control means including a number of mechanical or magnetic actuating elements corresponding to a digit and being correlated with an order of a telephone number is that the series of control means in each row represents a predetermined telephone number; indicia means for designating the respective telephone numbers; feeler means including electric means, such as a contact, or a pick-up head; guide means for guiding the feeler means across the band; means, for example, a let-off roll and take-up roll, for moving the band in longitudinal direction for positioning a selected row of control means corresponding to a selected telephone number along the path of movement of the electrical means; and operating means for moving the feeler means so that the contact means, or the pick-up head, passes successively over the actuating elements of the selected row. In this manner, electric pulses are created by the contact means or by the pick-up head which are transmitted to the telephone apparatus, and since the number and sequence of pulses correspond to the desired and selected telephone number, the telephone apparatus obtains the desired connection.

The necessary pulses are created during movement of the feeler means and the electrical means in one direction to an end position. During the return movement of the feeler means, creation of pulses is undesired, and consequently control switch means are connected into the circuit which disconnect the telephone apparatus from the electrical pulse-creating means during the return movement of the feeler means so that no pulses are transmitted to the telephone apparatus while the feeler means passes in the wrong opposite direction over the actuating elements on the band means.

In one embodiment of the invention, the control switch means is mounted on the feeler means, moves with the same, and is shifted in the end positions of the feeler means. In another embodiment of the invention, the feeler means is mounted on an elongated member which has two portions for actuating the stationary control switch in the end positions of the feeler means.

Numbers designating the telephone numbers which are marked on the band in the form of magnetic of mechanical actuating elements are provided on the band and appear in a window of the housing when the actuating elements of the respective telephone number are placed along the path of movement of the feeler means. In one embodiment, the digits of the telephone number appear directly adjacent, for example above or below, the groups of actuating elements representing the respective digit.

In another embodiment, the telephone number is shown aligned with the respective row of actuating elements in a marginal portion of the band, where preferably also spaces for the name of the subscriber having the respective telephone number is provided.

In another embodiment of the invention, a second band is provided which moves in synchronism with the band carrying the actuating elements, and the second band is provided with the telephone numbers which are read from a suitably arranged window.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figures 1, 2, 3:
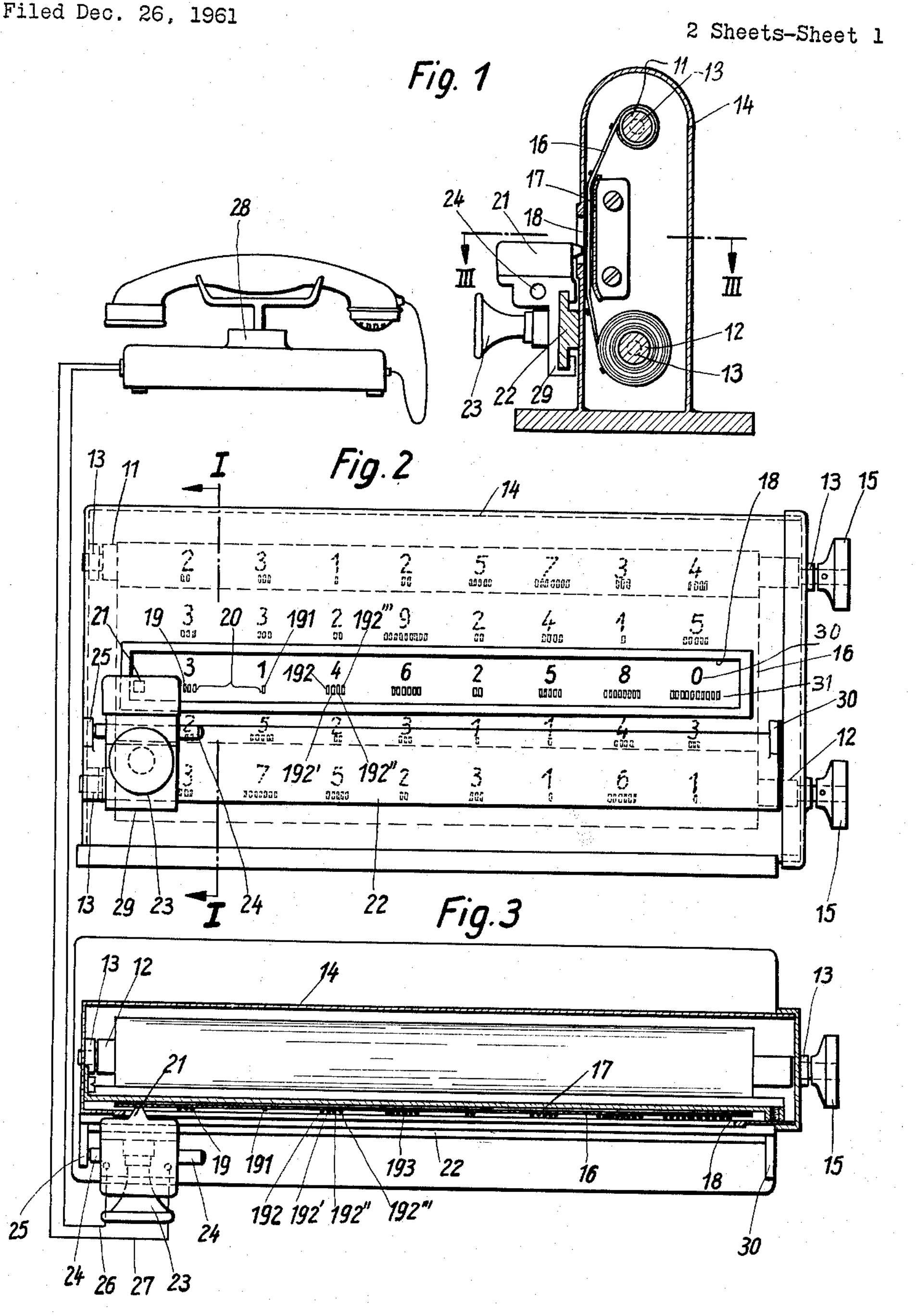
FIG. 1 is a vertical cross sectional view taken on line I—I in FIG. 2.
FIG. 2 is a front view of a dialing device according to one embodiment of the invention.
FIG. 3 is a horizontal sectional view taken on line III—III combined with a diagrammatic front view of a telephone apparatus.

Referring now to the drawings, and more particularly to FIG. 1 to FIG. 3, two rolls 11 and 12 have shafts turnably mounted in a housing 14, and are provided with knobs 15 which can be manually operated to wind a band 16 either on roll 11, or on roll 12 while band 16 is supported on a plate 17 for movement past a window 18.

Telephone numbers 30 are printed or written across band 16, and when the band is operated, each telephone number 30 can be placed opposite window 18 to be visible to the person operating the device. In FIG. 2, a telephone number 31, 462,580 is assumed to be selected and appears in window 18. It is assumed that a telephone number may include eight orders, but the device can be adapted to telephone numbers having fewer orders, or more orders.

The indicia digits 30 may be typed on the band, or stamped by a rubber stamp, and the telephone numbers 30 will be those numbers which are most frequently used by the telephone subscriber using the device.

Corresponding to telephone numbers having eight orders, eight control means are provided for each telephone number and arranged in rows 31. Each control means consists of an aligned group of magnetic elements, the number of magnetic elements corresponding to the digits in the respective order of the telephone number. For example, the digit of the highest order of the selected telephone number 30 is 3, and correspondingly three magnetic elements 19 are provided on the band. The digit of the next lower order is 1, and consequently a single magnetic element 191 is provided on the band spaced a distance 20 from the magnetic elements 19, distance 20 being substantially greater than the distance between the adjacent magnetic elements 19. In the next lower order, four magnetic elements 192, 192', 192'', 192''' are provided. The following order has six magnetic elements 193 aligned in a group. The digit zero may be expressed by ten magnetic elements.

A great number of telephone numbers can be provided on band 16, and a desired telephone number can be easily selected by turning one of the knobs 15.

A feeler means 29 is mounted on a guide means 22 and includes a pick-up head 21 which moves with feeler means 29 along a path in which the row of control means 31 of the selected telephone number is located.

A handle 23 is secured to the feeler means 29 so that the same may be manually shifted from the initial position shown in FIG. 2 to the other end position located at the right side of the band and housing. Of course, the feeler means could also be moved by electrical and pneumatic devices, or moved manually in one direction, and returned by resilient means in the other direction.

Feeler means 29 also supports a control switch means connected in series with the pick-up head and being shiftable between a closed 19 and a circuit breaking position by an operating member 24. When feeler means 29 is in the illustrated end position, an abutment 25 has engaged operating member 24 when the same arrived in the illustrated position, and has pushed operating member 24 to the right as viewed in the drawing. In this position of operating member 24, the control switch connects the pick-up head 21 to the telephone apparatus 28, but when feeler means 29 is shifted to other end position, the actuating means 30 pushes operating member 24 to the left, and the control switch is placed in its circuit breaking position so that the telephone apparatus 28 is disconnected from the pick-up head.

When the feeler means 29 is shifted to the right as viewed in the drawing along the guide means 22, the pickup head successively passes over the selected row of magnetic elements. When pick-up head 21 passes over magnetic elements 19, three pulses are created in the pick-up head which are transmitted to the telephone apparatus 28 and have the same effect as if the dial of a conventional telephone apparatus would be turned to select the number 3. During the following movement, pick-up head 21 creates one pulse when passing over magnetic element 191, four pulses when passing over magnetic element 192, six pulses when passing over the control means 193 which includes six magnetic elements, and so forth until the telephone apparatus has received the series of groups of pulses necessary for obtaining the desired telephone function.

During the movement of the feeler means 29 to the right as viewed in the drawing, all pulses were transmitted to the telephone apparatus through the control switch in its circuit making position. When the feeler means 29 arrives at the right end position thereof, actuating means 30 shifts operating member 24 and the control switch to the circuit breaking position so that during the following return movement of the feeler means and pick-up head to the left, no pulses are transmitted to the telephone apparatus 28, although pick-up head 21 passes over the magnetic elements of the row 31 and creates corresponding pulses in a reverse order.

Any telephone number represented on the band by magnetic control means and identified by indicia, can be selected by moving the band in longitudinal direction by means of a knob 15. Since complete telephone numbers are permanently represented on the band, the selection can be rapidly carried out.

In the illustrated embodiment, the indicia 30 are arranged directly adjacent the groups of magnetic elements. However, it is also possible to provide indicia in the form of closely spaced printed numbers aligned with the rows 31 and in the region of a marginal portion of the band so that a smaller window can be provided, while the control means 19, 199, 192, 193, etc. are covered by the housing. The groups of magnetic elements must be spaced a certain distance 20, since otherwise the telephone apparatus could not distinguish between the groups of pulses respectively associated with the digits of the telephone number.

Instead of providing the indicia in a marginal portion of band 16, a second band may be provided with indicia and connected to band 16 to move at the same speed and in synchronism with the same. In these arrangements, spaces for the numbers of the subscribers having the respective telephone numbers may be provided. Preferably, the names of the subscribers, and the respective telephone numbers, are arranged in alphabetical order. On a wider marginal space, or on a second band, space for notations concerning telephone calls with the respective other subscribers may be provided. In this manner, a fast and easy control of all calls can be obtained.

In the illustrated embodiment, the band is manually wound, but evidently the knobs 15 can be driven by a motor. An electric motor driving rolls 11 and 12 can be provided with a selector switch by which a desired telephone number is selected, whereupon the motor rapidly turns the rolls to a position in which the desired telephone number appears in the selector window 18.

Figure 4:
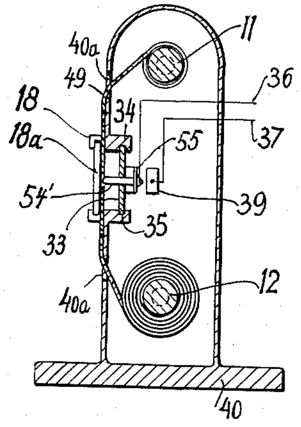
FIG. 4 is a vertical sectional view of another embodiment of the invention.
Figure 5:
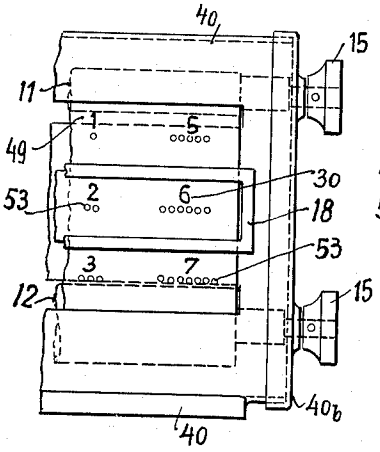
FIG. 5 is a fragmentary front view of the embodiment shown in FIG. 4.
Figure 6:
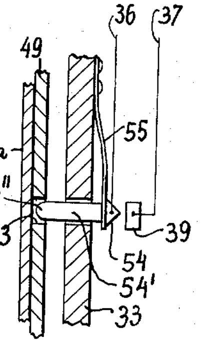
FIG. 6 is a fragmentary sectional view taken on line VI—VI in FIG. 4 and illustrating a detail on an enlarged scale.

The embodiment shown in FIGS. 4, 5 and 6 is similar to the embodiment of FIGS. 1 to 3 inasmuch as a band 49 is moved and wound up on rolls 11 and 12 operated by knobs 15. A housing 14 is provided which has a front wall formed with two slots 40*a* through which the band 49 passes through the outside of the housing. Rows of control means 53 are provided on the band, but in the embodiment of FIGS. 4 to 6, each control means includes a group of closely spaced recesses or openings. The band is guided between the front wall of the housing and the glass plate 18*a* of the window means 18, and has indicia 30 designating the respective telephone numbers. An elongated member 33 is guided in guide means 34 on the housing, and extends across the housing. Member 33 has a handle portion projecting from a side wall 40*b* of the housing so that member 33, which preferably has the form of a narrow long plate or bar, can be pulled out of the housing and be pushed back into the same. A feeler pin 54' is secured to a resilient contact arm 55 which has a contact 54 and is mounted on elongated member 33. Contact 54 cooperates with a contact 39 fixed on member 33 opposite contact 54, so that whenever the end portion 54'' of feeler pin 54' passes into one of the recesses or openings 53 of band 49, contact 54 moves away from the fixed contact 39 to a circuit breaking position. Conductors 36 and 37 connect contacts 54 and 39 to the telephone apparatus, as described with reference to FIG. 3.

The elongated member 33 has two spaced projections which cooperate with a stationary control switch in the two end positions of member 33. When member 33 is pushed all the way into the housing, contact 54 and contact pin 54'' are located on the left side on the housing, as shown for pick-up head 21 in FIG. 2. In this position, one of the actuating portions on member 33 engages the stationary control switch, and shifts the same to a circuit making position in which the switch remains during the following movement of member 33 to the right. Contact pin 54' passes successively into the recesses 53 of the respective selected row, and produces impulses by interrupting and closing the circuit of the telephone apparatus. Such impulses effect the selection of the selected telephone number. When the feeler means including contact 54, 39 and contact pin 54' arrives in the right end position, the second actuating portion on the elongated member 33 shifts the control switch to the circuit breaking position in which the switch remains during the following return movement of member 33 to the left as viewed in FIG. 5.

It will be understood that each of the elements described above or two or more together, may also find a useful application in other types of dialing apparatus for telephones differing from the types described above.

While the invention has been illustrated and described as embodied in a dialing device in which magnetic pulse creating elements are provided on a manually operated band and sensed by a pick-up head, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A dialing apparatus for impulse controlled telephone apparatus, comprising, in combination, a flexible band mounted for movement in longitudinal direction thereof between a plurality of positions and having a plurality of series of transversely spaced control means representing subscriber telephone numbers and each control means representing an order of the respective telephone number, said plurality of series being arranged in parallel transverse rows so that all said control means of each series move together to represent the same telephone number in any longitudinal position of said band, each control means having a number of mechanical actuating elements corresponding to a digit; indicia means for designating the respective telephone numbers; feeler means including electrical contact means having an impulse creating condition and an inoperative condition; means guiding said feeler means with said electrical contact means for movement along a path across said band; circuit means for connecting said electrical contact means with the telephone apparatus; take-up and let-off means for moving said band in longitudinal direction thereof between said positions for positioning a selected series of control means corresponding to a selected telephone number along said path; and operating means for moving said feeler means with said electrical contact means along said guide means and said path so that said electrical contact means passes successively over said mechanical actuating elements of each of said control means of the selected series, said mechanical actuating elements placing said electrical contact means in said impulse creating condition whereby an electric pulse is created whenever said electrical contact means passes over one of said mechanical actuating elements so that electric pulses corresponding to the selected telephone number are created and transmitted to the telephone apparatus.

2. A dialing appartus for impulse controlled telephone apparatus, comprising, in combination, a flexible band mounted for movement in longitudinal direction thereof between a plurality of positions and having a plurality of series of transversely spaced control means representing subscriber telephone numbers and each control means representing an order of the respective telephone number, said plurality of series being arranged in parallel transverse rows so that all said control means of each series move together to represent the same telephone number in any longitudinal position of said band, each control means having a number of mechanical actuating elements corresponding to a digit; indicia means for designating the respective telephone numbers; two rolls connected to the ends of said band; a housing enveloping said band and said rolls and turnably supporting said rolls, said housing having a window; feeler means including electrical contact means having an impulse creating condition and an inoperative condition; means on said housing guiding said feeler means with said electrical contact means for movement along a path across said band; circuit means for connecting said electrical contact means with the telephone apparatus; take-up and let-off means for moving said band in longitudinal direction thereof take-up and let-off for positioning a selected series of control means corresponding to a selected telephone number along said path and for positioning said indicia means in said window; and operating means for moving said feeler means with said electrical contact means along said guide means and said path so that said electrical contact means passes successively over said mechanical actuating elements of each of said control means of the selected series, said mechanical actuating elements placing said electrical contact means in said impulse creating condition whereby an electric pulse is created whenever said electrical contact means passes over one of said mechanical actuating elements so that electric pulses corresponding to the selected telephone number are created and transmitted to the telephone apparatus.

3. A dialing apparatus for impulse controlled telephone apparatus, comprising, in combination, a flexible band mounted for movement in longitudinal direction thereof between a plurality of positions and having a plurality of series of transversely spaced control means representing subscriber telephone numbers and each control means representing an order of the respective telephone number, said plurality of series being arranged in parallel transverse rows so that all said control means of each series move together to represent the same telephone number in any longitudinal position of said band, each control means having a number of mechanical actuating elements corresponding to a digit; indicia means for disignating the respective telephone numbers; two rolls connected to the ends of said band; a housing enveloping said band and said rolls and turnably supporting said rolls, said housing having a window; feeler means including electrical contact means having an impulse creating condition and an inoperative condition; means on said housing guiding said feeler means with said electrical contact means for movement along a path across said band; circuit means for connecting said electrical contact means with the telephone apparatus, said circuit means including control switch means having a circuit making position, and a circuit breaking position for disconnecting said electrical contact means from the telephone apparatus; take-up and let-off means for moving said band in longitudinal direction thereof between said positions for positioning a selected series of control means corresponding to a selected telephone number along said path and for positioning said indicia means in said window; operating means for moving said feeler means with said electrical contact means along said guide means and said path so that said electrical contact means passes successively over said mechanical actuating elements of each of said control means of the selected series, said mechanical actuating elements placing said electrical contact means in said impulse creating condition whereby an electric pulse is created whenever said electrical contact means passes over one of said mechanical actuating elements so that electric pulses correspond to the selected telephone number are created and transmitted to the telephone apparatus, said operating means including an elongated member supporting said feeler means and being mounted on said guide means, said elongated member having a handle portion transversely projecting from said housing, said elongated member having a portion for actuating said control switch means to move to said circuit breaking position when said feeler means arrives at an end position after moving along said path in one direction so that no pulses are transmitted to the telephone apparatus during the return movement of said feeler means with said electrical contact means in the opposite direction along said path and over said mechanical actuating elements of the selected series.

4. An arrangement as set forth in claim 3 wherein said elongated member has another portion, said portions being located on opposite sides of said control switch means so that said control switch means is shifted to the circuit making position at the end of the return movement of said elongated member.

5. An arrangement as set forth in claim 4 wherein said actuating elements are transversely aligned recesses in said band means, and wherein said feeler means includes a feeler pin sliding on said band means and over said recesses and connected to said electrical contact means for operating the same.

References Cited by the Examiner

UNITED STATES PATENTS

| | | | |
|---|---|---|---|
| 1,891,633 | 12/32 | Batdorf | 179—90.2 |
| 2,191,913 | 2/40 | Lewis | 179—90.2 |
| 2,921,142 | 1/60 | Tinus | 179—90.2 |
| 3,028,453 | 4/62 | Kappeler et al. | 179—90.2 |
| 3,040,133 | 6/62 | Kobler | 179—90.2 |
| 3,104,288 | 9/63 | Kobler | 179—90.2 |

ROBERT H. ROSE, *Primary Examiner.*